US011138164B1

(12) United States Patent
Munuhur Rajagopal et al.

(10) Patent No.: US 11,138,164 B1
(45) Date of Patent: Oct. 5, 2021

(54) ALTER TABLE IMPLEMENTATION DETAILS WITH SCHEMA VERSIONING

(71) Applicant: Amazon Technologies, Inc., Seattle, WA (US)

(72) Inventors: Lakshmi Narasimha Guptha Munuhur Rajagopal, Seattle, WA (US); Almero Gouws, Seattle, WA (US); Akshat Vig, Seattle, WA (US); Derek William Richard Chen-Becker, Centennial, CO (US); Haifeng He, Bellevue, WA (US); Lewis Bruck, Bothell, WA (US); Aishwarya Kamal, Remond, WA (US); Somasundaram Perianayagam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 16/698,404

(22) Filed: Nov. 27, 2019

(51) Int. Cl.
*G06F 16/21* (2019.01)
*G06F 16/22* (2019.01)

(52) U.S. Cl.
CPC .......... *G06F 16/213* (2019.01); *G06F 16/221* (2019.01); *G06F 16/2282* (2019.01)

(58) Field of Classification Search
USPC ........................................... 707/803
See application file for complete search history.

(56) References Cited

U.S. PATENT DOCUMENTS

| 2004/0073565 | A1* | 4/2004 | Kaufman | ............... G06F 16/252 |
| 2005/0154742 | A1* | 7/2005 | Roth | ...................... G06Q 10/10 |
| 2011/0191303 | A1* | 8/2011 | Kaufman | ................ G06F 16/20 |
|  |  |  |  | 707/684 |
| 2020/0311304 | A1* | 10/2020 | Parthasarathy | ..... G06F 11/3006 |

* cited by examiner

*Primary Examiner* — Hung T Vy
(74) *Attorney, Agent, or Firm* — Davis Wright Tremaine LLP

(57) ABSTRACT

A service implements techniques for modifying a data table stored in a key-value or non-relational database via a table-oriented schema. In some aspects, a request to modify a table-oriented schema of a table of data may be received. In response to the request, an association between a customer identifier of elements of the table and an internal identifier of elements of the table may be stored that updates a prior association between a customer identifier and an internal identifier. The table-oriented schema of the table may be modified using one or more keys that are generated using the internal identifier.

20 Claims, 9 Drawing Sheets

| field | Type | Purpose/Notes |
|---|---|---|
| subscriberID | String | Hash key for index |
| tableName | String | Range key for index |
| metadataVersion | Number | Metadata version for structure of the schema table |
| schemaVersion | Number | Version of schema for the user table |
| timestamp | String | Timestamp of the schema version. Needed for restores. |
| internalUserTableName | String | The ID which is the table name of the backing table |
| schema | see FIG. 4 | Schema information for the table |

FIG. 3

| field | Type |
|---|---|
| partitionKeys | List <ColumnAttribute> |
| staticColumns | List <ColumnAttribute> |
| regularColumns | List <ColumnAttribute> |
| maxColumnIndex | Number |
| comment | String |
| defaultTTL | Number |

| ColumnAttribute | |
|---|---|
| Field | Type |
| ColumnName | String |
| ColumnType | String |
| internalColumnName | String |
| order | String |

FIG. 4

ALTER TABLE IMPLEMENTATION DETAILS WITH SCHEMA VERSIONING

BACKGROUND

In various contexts, users may interact with various database systems that utilize schemas, which define how data is organized and how relations between the data are associated. In some cases, various schemas may be sued to define different structures of a database, such as, for example, tables in relational databases. In some cases, it may be desirable to modify the schema of how a collection of data is stored. These modifications may present challenges, including for example, propagating schema changes across a distributed database system, efficiently implementing the schema changes across a database system, and a number of other challenges.

BRIEF DESCRIPTION OF THE DRAWINGS

Various techniques will be described with reference to the drawings, in which:

FIG. 3 illustrates an example of a schema table, in accordance with an embodiment;

FIG. 4 illustrates an example of a schema, in accordance with an embodiment;

DETAILED DESCRIPTION

Figure 1:
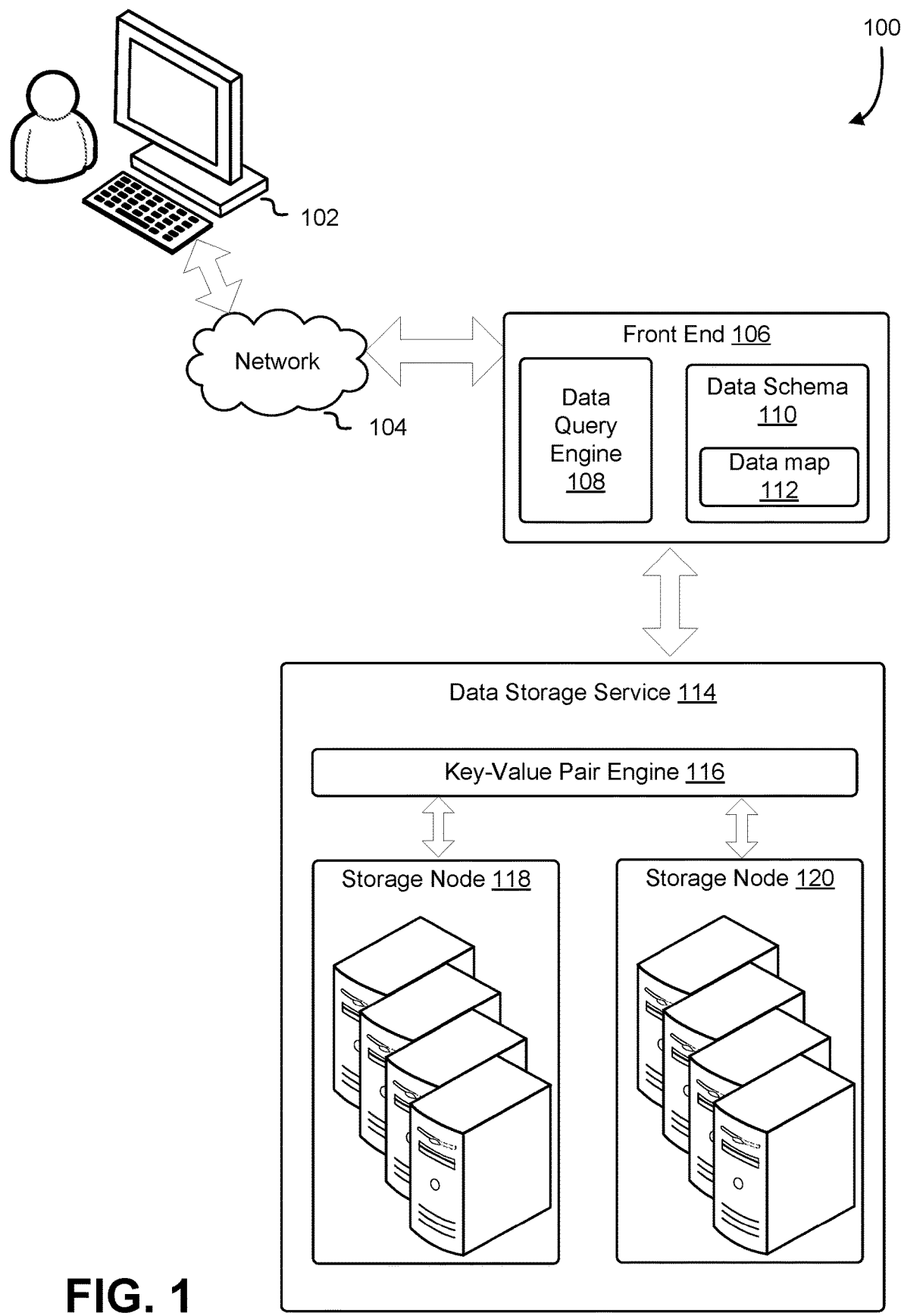
FIG. 1 illustrates a diagram of a data storage service, in accordance with an embodiment.

Systems and methods are described herein for providing a way to implement and track changes made to schemas used to organize data in one or more collections stored in a database system. The described techniques may utilize a data schema that maps customer or external columns identifiers for a data table to internal identifiers used to store the underlying data. The data schema may support adding, deleting, and modifying attributes of columns in a data table, such as typically supported by relational or table-oriented databases. Changes made to the schema may be propagated to one or more storage nodes of a database system, which may be a key-value or non-relational database. Using the described data schema, higher level operations for modifying a data table schema may be supported with a key value, non-relational, or other database system.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

A key value or non-relational database system may store data objects, or items, according to various flexible policies, across one or more storage nodes. The key-value database system may identify stored items using key-value pair identifiers, in which a specific identifier may identify a specific stored item. In various embodiments, a front end host or system may interact with the key-value database system. The front end system may store data objects in the key-value database system by instructing one or more storage nodes. The front end system may maintain a relational or table-oriented schema, which defines columns and attributes for a data table, that enables various higher level operations to be performed on data, typically stored by a relational or table-oriented database, including modifying columns of tables of data, but stored in an underlying key-value database. The relational or table-oriented schema may map column names, such as those defined by a user or customer, to internal column names that form keys in a key-value pair database system used to access various data objects or items. This mapping may take the form of associations between the customer identifier of a column and the internal identifier of a column.

The front end system may, upon receiving an instruction to modify the table-oriented schema of a column of a data table stored by the key-value database, identify a corresponding internal column identifier corresponding to a customer column identifier of the data table. The front end system may then instruct at least one storage node of the key-value database to modify the column of the data table according to the internal column identifier. For example, if the instruction specifies modifying a column name, the front end system may instruct the storage node to store a new key value pair associated with the new column name. Instructions to modify the data type of or other attribute of a column may be performed in a similar way. Adding a column may be performed by adding a new column and mapping a new association between a customer identifier of the column and an internal identifier used to actually store the column. Deleting a column may be achieved by breaking the association in the relational or table-oriented schema between the customer identifier and the internal identifier, and may not necessitate actually deleting the underlying data stored by the key-value database. In this way, the table-oriented schema may support higher level operations while utilizing a less sophisticated key-value database system.

In some aspects, the internal column names or identifiers may be selected based on a predefined scheme, such as monotonically increasing. The front end host may track the internal identifiers used for already stored or modified items. In some cases, using a structure identifier scheme for the underlying key-value database may ensure that data is not mistakenly overwritten, by ensuring that the correct internal column identifier is used to store new data.

In some cases, each occurrence of a change (e.g., modification, addition, or deletion), of a column may be stored as an entry in the table-oriented schema. Each new entry in the table-oriented schema may correspond to a new version of the schema. In order to ensure that the correct data is modified according to the table-oriented schema, the front end system may propagate changes to the schema to other front end systems that may be used to access the data according to the table-oriented schema. In some cases, the front end system may coordinate with storage nodes to ensure that the correct version of the table-oriented schema is used. For example, upon changing a column of a data table, a storage node may send an update or notification to the front end system, to enable the front end system to update the table-oriented schema. In some cases, the storage nodes themselves may maintain a version of the table-oriented schema, may update it accordingly, and may sync back with the front end host to ensure the correct table-oriented schema version is used across the data storage system.

In some examples the described schema versioning system and techniques may be applied to other software updates and other systems, beyond database structures. In some cases, the described schema may be utilized to track and manage changes to various systems including versioning for software applications at various levels of granularity. In yet some cases, the described schema may be utilized to track any changes to data, including various data structures and objects, and executable instructions, across any of a number of different fields or applications, and support the various features and functionality described herein.

As one skilled in the art will appreciate in light of this disclosure, certain embodiments may be capable of achieving certain advantages, including some or all of the following: (1) supporting table-oriented or relational database operations within a key-value or non-relational database; and (2) reduction in the amount of resources needed to access and modify data schemas via database operations, among other benefits and advantages, as will be described throughout the disclosure.

FIG. 1 illustrates a diagram of a data storage service, in accordance with an embodiment. Specifically, FIG. 1 depicts an entity 102, which may, via a network 104, access a front end 106 comprising a data query engine 108, table-oriented or relational data schema 110, and data map 112. The front end 106 may interact with a data storage service 114, which may comprise a key-value pair engine 116 that communicates with a storage node 118 and a storage node 120. In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system described in connection with FIG. 9.

The entity 102 may be any entity including one or more computing devices operated by a user of customer of a data storage service 114. The entity 102 may be operable to access the data storage service 114 and the front end 106. The entity 102 may utilize the network 104, which may be a network such as the Internet, to interact with the front end 106. The entity may utilize various telecommunications networks and service providers that collectively implement the Internet, including private networks such as local area networks (LANs) or wide area networks (WANs) as well as public or private wireless networks, which the network 104 may comprise. In various embodiments, the entity 102 may utilize a suitable version of a web browser, or a plugin module or other type of code module configured to execute as an extension to or within an execution environment provided by a web browser to access the front end 106.

The data storage service 114 include one or a number of computing devices, including any of a combination of hardware computing devices, servers, virtual machines, or other resources. The data storage service 114 may be a service that provides data storage services to storage service clients (e.g., user, client, subscribers, or client applications, such as part of entity 102, that access the data storage service on behalf of users or subscribers). The data storage service 114 may store and maintain data objects on behalf of clients in a key-value data store, e.g., a non-relational database. The data storage service 114 may, in various embodiments, support a flexible schema, a plurality of available consistency models, a variety of service level and/or business model options, multiple indexing options, and/or multiple query types. In some embodiments, storage service clients (e.g., users, subscribers or client applications) may interact with the data storage service 114 through a web service interface using a set of APIs (application programming interfaces).

In various embodiments, the data storage service 114 may provide an application programming interface that includes support for some or all of the following operations on data objects maintained by the data storage service 114 on behalf of a storage service client: put (or store) a data object, get (or retrieve) one or more data objects having a specified primary key, delete a data object, update the attributes in a single data object, query for data objects using an index, and scan (e.g., list items) over a collection of data objects, optionally filtering the data objects returned. In some embodiments, the data storage service 114 (and/or the underlying system that implements the service) may support a strong consistency model, in addition to supporting eventually consistent read operations.

The data storage service 114 may maintain data organized by collections of items. The data storage service 114 may utilize the key-value pair engine 116 to manage data organized by collections of items. The items may each comprise a set of name value pairs, a set of values, and/or variations thereof. In various embodiments, individual items may not conform to any particular schema, and each item may accordingly contain a different number of values—each of which may have a different logical meaning and type. Values that have the same logical meaning and type, such as those identified by the same name, may for convenience be referred to as columns. Some embodiments of the data storage service 114 may enforce various structural requirements, such as row and column format, uniqueness constraints, primary and foreign key relationships and the like. The items may be identified by key values. A primary key value, taken as a whole, may uniquely identify a stored item. To access an item, a client of the data storage service 114 may issue a request that refers to a primary key value that corresponds to that item.

In various embodiments, the data storage service 114 may be implemented by one or more computing nodes and/or may be distributed across several computing nodes. In some embodiments, a given computing node may implement the functionality of one or more components of the data storage service 114. In various embodiments, the data storage service 114 may be implemented on one or more computing nodes that are configured to perform various processes, including maintaining and managing one or more data objects on behalf of clients/users or on behalf of the data storage service 114 (and its underlying system) itself. In some examples, the data storage service 114 may store data in storage nodes, such as the storage node 118 and the storage node 120, which may be identifiable through various key-value pairs through the key-value pair engine 116.

The front end 106 may be a service configured to receive, authenticate, parse, throttle and/or dispatch data service/management requests, among other things. The front end 106 may be a service that stores data objects in the data storage service 114 and may manage data objects on behalf of a client or entity 102. The front end 106 may maintain data objects according to various table-oriented or relational schemas (also referred to herein as schemas), and may store or facilitate storing the data objects in the data storage service 114. The front end 106 may organize data objects in the form of tables, which may map to data objects stored in the data storage service 114. In various embodiments, the front end 106 may implement various table-oriented or relational schemas, which clients may utilize to manage data objects. In some examples, a client may utilize the front end 106 to store one or more data objects structured according to a defined schema, in which the front end 106 may store the one or more data objects in the data storage service 114. For example, a client may utilize the front end 106 to store a table structured according to a schema, in which the front end 106 may store data objects associated with the table in the data storage service 114, map the stored data objects in the data storage service 114 to one or more elements of the table, and present the table structured according to the schema to the client.

The front end 106 may include a data query engine 108. The data query engine 108 may be a component of the front end 106 configured to process data management requests, which may be received through the network 104. In various embodiments, the data query engine 108 may parse requests to determine one or more processes to perform in connection with the requests. The data query engine 108 may utilize the table-oriented data schema 110, which may comprise the data map 112. The table-oriented data schema 110 may be a component of the front end 106 that is configured to maintain table-oriented data schemas. The table-oriented data schema 110 may comprise schema information that may be utilized to structure data which may be stored in the data storage service 114.

The table-oriented data schema 110 may comprise the data map 112, which may map data associated with a defined schema to data stored in the data storage service 114, such as mapping internal column names used by the data storage service 114 to customer column names used by the client to access and modify data. In some aspects, the table-oriented data schema may be stored by the data storage service 114, whereby the front end 106 may access the table-oriented data schema from the data storage service 114. In other cases, the front end 106 may store and/or maintain the table-oriented data schema 110.

In some examples, a client may desire to modify stored data objects structured according to a defined schema. The client may utilize the front end 106 to submit a request to modify the table-oriented data schema 110 used to store the data objects structured according to the defined schema. The request may be formatted in various computing languages, such as structured query language (SQL) and/or variations thereof. The front end 106 may receive the request, use the table-oriented data schema 110 and data map 112 to translate the request to internal identifiers used by the data storage service 114. The front end 106 may then instruct the data storage service 114 to modify the stored data according to the requested change to the table-oriented data schema 110. The front end 106 may map one or more components of the structure of the defined schema to the data objects stored in the data storage service 114. The client may utilize the front end 106 to access and/or manage the data objects stored in the data storage service 114 through the structure according to the defined schema. The front end 106 may perform one or more processes in connection with the data objects such that the data objects are presented structured in the defined schema to the client, where the data objects may be stored according to various other formats in the data storage service 114.

In other examples, a client such as the entity 102 may utilize the front end 106 to store a table of data defined by a table-oriented schema in the data storage service 114. The client may further desire to modify the table-oriented schema of the data table. The client may submit a request to the front end 106 to modify a column of the data table. The front end 106 may identify a corresponding internal column identifier corresponding to a customer column identifier of the data table. The front end 106 may then instruct at least one storage node of the storage nodes 118 and 120 of the data storage service 114 to modify the column of the data table according to the internal column identifier. For example, if the instruction specifies modifying a column name, the front end 106 may instruct the storage node to store a new key value pair associated with the new column name. Instructions to modify the data type of or other attribute of a column may be performed in a similar way. Adding a column may be performed by adding a new column and mapping a new association between a customer identifier of the column and an internal identifier used to actually store the column. Deleting a column may be achieved by breaking the association in the table-oriented schema between the customer identifier and the internal identifier, and may not necessitate actually deleting the underlying data stored by the data storage service 114. In this way, the table-oriented schema may support higher level operations while utilizing a less sophisticated key-value database system or other dissimilar database system such as the data storage service 114.

In some aspects, the internal column names or identifiers may be selected based on a predefined scheme, such as monotonically increasing. The front end 106 may track the internal identifiers used for already stored or modified items. In some cases, using a structure identifier scheme for data storage service 114 may ensure that data is not mistakenly overwritten, by ensuring that the correct internal column identifier is used to store new data.

In some cases, each occurrence of a change (e.g., modification, addition, or deletion), of a column may be stored as an entry in the table-oriented schema. Each new entry in the table-oriented schema may correspond to a new version of the schema. In order to ensure that the correct data is modified according to the table-oriented schema, the front end 106 may propagate changes to the schema to one or more other front end systems that may be used to access the data according to the table-oriented schema. In some cases, the front end 106 may coordinate with storage nodes to ensure that the correct version of the table-oriented schema is used. For example, upon changing a column of a data table, a storage node may send an update or notification to the front end 106, to enable the front end 106 to update the table-oriented schema. In some cases, the storage nodes themselves may maintain a version of the table-oriented schema, may update it accordingly, and may sync back with the front end 106 to ensure the correct table-oriented schema version is used across the data storage service 114.

Figure 2:
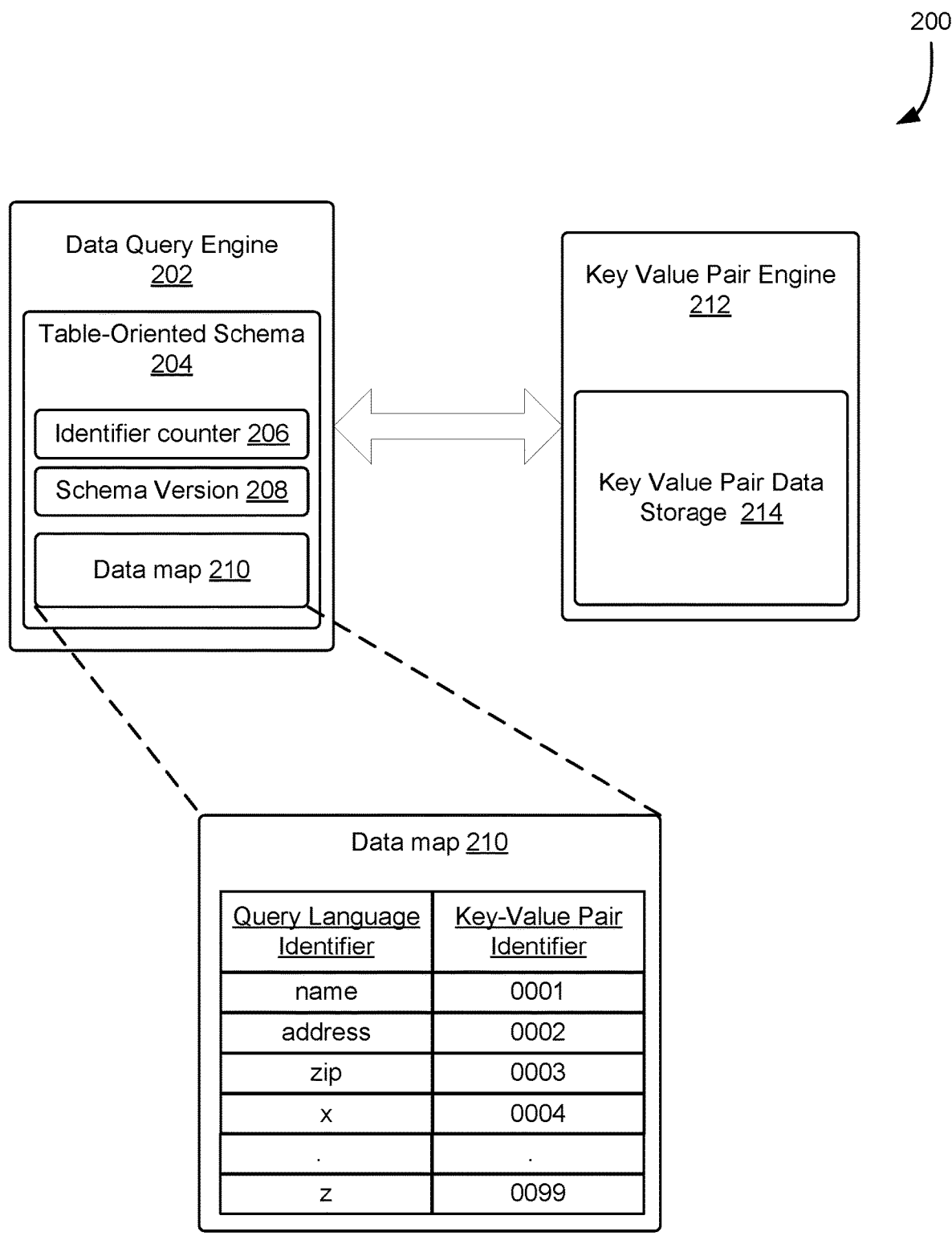
FIG. 2 illustrates an example of a data query engine and a key value pair engine, in accordance with an embodiment.

FIG. 2 illustrates an example 200 of a data query engine and a key value pair engine, in accordance with an embodiment. Specifically, FIG. 2 depicts a data query engine 202, which may comprise a table-oriented or relational data schema 204, identifier counter 206, schema version 208, and data map 210, which may interact with a key value pair engine 212 which may comprise key value pair data storage 214. The data query engine 202 may be a component of a front end system, such as the front end 106 as described in connection with FIG. 1. The key value pair engine 212 may be a component of a database system, such as the data storage service 114 as described in connection with FIG. 1.

The data query engine 202 may process requests from an entity to store data objects, such as a table, which may be structured according to a table-oriented schema. The data query engine 202 may additionally process requests to modify various table-oriented or relational schemas of data objects that may have already been stored in a database system through one or more processes of the data query engine 202. The data query engine 202 may store data objects, which may be structured by a defined schema, in a database system that may be structured according to various policies, and manage the stored data objects according to the defined schema. The data query engine 202 may utilize the table-oriented data schema 204 to manage various table-oriented schemas. The table-oriented data schema 204 may comprise various data stores, objects, and/or databases that may manage table-oriented data schemas on behalf of the data query engine 202. The data query engine 202 may utilize the table-oriented data schema 204 to manage data objects that may be stored in another database system.

The table-oriented data schema 204 may include an identifier counter 206, which may be a counter that corresponds to one or more elements of various table-oriented data schemas. In some examples, the identifier counter 206 may track any modifications to data objects stored in a database system, which may be managed/accessed according to various table-oriented data schemas through the data query engine 202. The identifier counter 206 may additionally track any modifications made to various table-oriented schemas through the data query engine 202. The schema version 208 may be a data store, object, and/or database that may indicate various versions of schemas managed by the table-oriented data schema 204. The schema version 208 may be utilized to determine if a schema managed by the table-oriented data schema 204 is outdated. The data map 210 may be a data store, object, and/or database that may map elements of a structure defined by a table-oriented data schema to items stored in a database system. In various embodiments, the data map 210 may map, as part of processing a request written in a query language, elements of the request to items which may be stored in another database system, which may be identified by key-value pair identifiers. In some examples, the data map 210 may map elements of a structure defined by a schema to one or more data objects stored in another database system, in which the one or more data objects may be identified by key-value pair identifiers.

The key value pair engine 212 may manage items stored in a database system. In various embodiments, the key value pair engine 212 may utilize the key value pair data storage 214, which may be a data store, object, and/or database that may manage items stored in the database system. The items stored in the database system may be structured according to various policies, and may not be defined by a particular schema. The items may be identifiable through a key value pair identifier, which may indicate the location and/or various other characteristics of the items. For example, an item may be stored in the database system, and may be identifiable by a single identifier, which may be a number, character, and/or variations thereof.

For example, one or more processes may cause the data query engine 202 to receive a request to store a table comprising various data objects, in which the table is structured according to a defined schema. Continuing with the example, the request may be formatted in a query language. The data query engine 202 may store the defined schema in the table-oriented data schema 204, as well as other related data in the schema version 208. The data query engine 202 may store the various data objects in a different database system, which may be structured according to various policies. Continuing with the example, the different database system may utilize the key value pair engine 212 and may store data objects according to key-value pair identifiers, in which each data object may be identifiable by an identifier. The data query engine 202 may utilize the data map 210 to map components of the structure of the defined schema to stored data objects in the different database system such that an entity may access and/or manage the data objects according to the defined schema. Continuing with the example, the data map 210 may indicate where data objects of the table are stored within the different database system.

As another example, one or more processes may cause the data query engine 202 to receive an instruction to modify the table-oriented schema of a data table, which may specify a column of the data table, in which the data table may have been stored in a key-value database system by the data query engine 202. The data query engine 202 may utilize the table-oriented data schema 204 to identify a corresponding internal column identifier corresponding to a customer column identifier of the data table. The data query engine 202 may then instruct at least one storage node of the key-value database system, which may comprise the key value pair engine 212, to modify the column of the data table according to the internal column identifier. For example, if the instruction specifies modifying a column name, the data query engine 202 may instruct the storage node to store a new key value pair associated with the new column name using the key value pair data storage 214. Instructions to modify the data type of or other attribute of a column may be performed in a similar way. Adding a column may be performed by adding a new column and mapping a new association through the data map 210 between a customer identifier of the column and an internal identifier used to actually store the column. Deleting a column may be achieved by breaking the association in the table-oriented schema between the customer identifier and the internal identifier, and may not necessitate actually deleting the underlying data stored by the key-value database system. In this way, the table-oriented or table-oriented schema may support higher level operations while utilizing a less sophisticated non-table-oriented or key-value database system.

In some aspects, the internal column names or identifiers may be selected based on a predefined scheme, such as monotonically increasing. The data query engine 202 may track the internal identifiers used for already stored or modified items utilizing the identifier counter 206. In some cases, using a structure identifier scheme for the underlying key-value database system may ensure that data is not mistakenly overwritten, by ensuring that the correct internal column identifier is used to store new data. In some cases, each occurrence of a change (e.g., modification, addition, or deletion) of a column may be stored as an entry in the table-oriented schema. Each new entry in the table-oriented schema may correspond to a new version of the schema, which may be tracked utilizing the schema version 208. In order to ensure that the correct data is modified according to the table-oriented schema, the data query engine 202 may propagate changes to the schema to other front end systems that may be used to access the data according to the table-oriented schema. In some cases, the data query engine 202 may coordinate with storage nodes to ensure that the correct version of the table-oriented schema is used. For example, upon changing a column of a data table, a storage node may send an update or notification to the data query engine 202, to enable data query engine 202 to update the table-oriented schema. In some cases, the storage nodes themselves may maintain a version of the table-oriented schema, may update it accordingly, and may sync back with the data query engine 202 to ensure the correct table-oriented schema version is used across the data storage system.

In some aspects, modifying the table-oriented schema 204 and/or the data map 210 may be performed without changing the underlying data stored according to the schema. For example, if a column name is changed, only the data map 210 may need to be updated to reflect the name change. In this example, the query language identifier in the data map 210 would be changed, but associated with the existing key-value pair identifier, such that the change would not affect the key-value pair engine or database, but would only change the schema 204. This would be reflected as a new row in the data map 210, with the new name in the query language identifier column, and the key value pair identifier 0001 associated with it. At a later time, when a customer wishes to access or modify the table having the new column name, the query data engine 202 would access the most recent entry corresponding to the customer given column name, and access that column via the internal identifier associated with it, in this case, 0001.

FIG. 3 illustrates an example of a schema table 300. In various embodiments, the schema table 300 may be a data structure that indicates one or more characteristics of a schema. A schema may define various constraints of a structure that may comprise one or more data objects. A schema may define various characteristics of the structure of a database in which one or more data objects may be stored. In some examples, a schema may define various aspects of a data object stored in a database. The schema table 300 may comprise various fields that may indicate various characteristics about a schema. In various examples, the schema table 300 may be utilized by the table-oriented or relational data schema 110 as described in connection with FIG. 1.

The "subscriberID" field may be a field that may identify the subscriber, or user/entity, of the schema table 300. In some examples, the "subscriberID" field may be utilized to determine a hash key, which may be utilized to determine an index. An index may be a data object associated with various keys. In various embodiments, queries may be issued directly to their indices. Indices may be utilized to support additional searches within a database. In various embodiments, an index may be utilized to identify one or more data objects.

The "tableName" field may be a field that may identify the name of the schema table 300, or a schema associated with the schema table 300. In some examples, the "tableName" field may be utilized to determine a range key, which may be utilized to determine an index which may be utilized to identify one or more data objects. In various embodiments, the range key may be utilized with the hash key to determine indices of various data objects, which may be utilized to locate the various data objects.

The "metadataVersion" field may be a field that indicates the metadata version for the structure of the schema table 300. In various embodiments, the schema table 300 may undergo various revisions, in which metadata may be generated for each version of the schema table 300. The various versions of the metadata may be indicated by the "metadataVersion" field. The "schemaVersion" field may be a field that indicates the version of the schema for the schema table 300. The schema associated with the schema table 300 may undergo various revisions, in which the schema may be altered through various processes (e.g., fields may be altered, added, and/or removed). The various versions of the schema may be indicated by the "schemaVersion" field.

The "timestamp" field may be a field that indicates a timestamp of the schema version. It may be utilized to restore various schema versions. The "internalUserTableName" may be a field that indicates a name of a table/data object associated with the schema table 300. In various embodiments, the "internalUserTableName" may be an identifier of a backing/back-up data object associated with the schema table 300. The "schema" field may indicate various aspects of the schema associated with the schema table 300. Further information may be found in the description of FIG. 4.

FIG. 4 illustrates an example of a schema 400. In various embodiments, the schema 400 may be the same or similar as the "schema" described in connection with FIG. 3. The schema 400 may define various constraints of a structure that may comprise one or more data objects. The schema 400 may define various characteristics of the structure of a database in which one or more data objects may be stored. The schema 400 may comprise various fields that may indicate various characteristics about a data structure associated with/defined by the schema 400.

The "partitionKeys" field may correspond to one or more keys associated with the schema 400. The "partitionKeys" may correspond to various keys (e.g., partition key) and/or values associated with stored data objects, which may be associated with the schema 400 and may be stored according to the schema 400. In some examples, each data object stored associated with the schema 400 may be associated with a particular key. In various embodiments, a key of the "partitionKeys" field may be utilized as an input to a hash function. The output from the hash function may determine the partition in which a data object associated with the key is stored. The locations of each data object associated with the schema 400 may be determined by the hash value of its partition key.

The "staticColumns" field may correspond to columns of the data structure defined by the schema 400. The "staticColumns" may correspond to columns of the data structure that are static. In some embodiments, a static column may refer to a column that may be utilized for the entire lifetime, or extent, of the data structure defined by the schema 400. The "staticColumns" may correspond to a one or more columns of the data structure, and may be defined by a list of columns defined by various "ColumnAttributes."

The "regularColumns" field may correspond to columns of the data structure defined by the schema 400. The "regularColumns" may correspond to columns of the data structure that are regular. In some embodiments, a regular column may refer to a column that may be modified/altered within the data structure defined by the schema 400. The "regularColumns" may correspond to a one or more columns of the data structure, and may be defined by a list of columns defined by various "ColumnAttributes."

The "maxColumnIndex" field may be a field that indicates the max number of columns of the data structure defined by the schema 400. The "comment" may be a field that may indicate various comments regarding the data structure defined by the schema 400. The "defaultTTL" may be a field that corresponds to a default time-to-live (TTL). In some embodiments, the "defaultTTL" may indicate a default time in which data objects of the data structure defined by the schema 400 expire. The "defaultTTL" may indicate a time period that, upon expiration of the time period, data objects of the data structure defined by the schema 400 may expire, and/or be deleted/erased through one or more processes. In some examples, "defaultTTL" may indicate a time in which data objects of the data structure defined by the schema 400 are automatically deleted.

In various embodiments, the data structure defined by the schema 400 may comprise various columns, which may be associated with various data objects. The data structure defined by the schema 400 may comprise columns which may be utilized to store various data and/or data objects. The "ColumnAttribute" may define various characteristics about the structure of a column. The "ColumnAttribute" may comprise various fields that correspond to various aspects of a column associated with a particular "ColumnAttribute."

The "ColumnName" field may be a field that indicates a name of a column associated with a particular "ColumnAttribute." The "ColumnType" field may be a field that indicates a type of a column associated with a particular "ColumnAttribute." The "ColumnType" may indicate the type of data stored in a column associated with a particular "ColumnAttribute," such as a string, integer, boolean value, and/or variations thereof. The "ColumnType" may indicate various aspects of a column associated with a particular "ColumnAttribute," such as size, type of data, usage, and/or variations thereof. The "internalColumnName" field may be an identifier that may identify a column associated with a particular "ColumnAttribute." The "order" field may identify the position or index of a column associated with a particular "ColumnAttribute" relative to other columns associated with other "ColumnAttributes," which may be part of the data structure defined by the schema 400.

Figure 5:
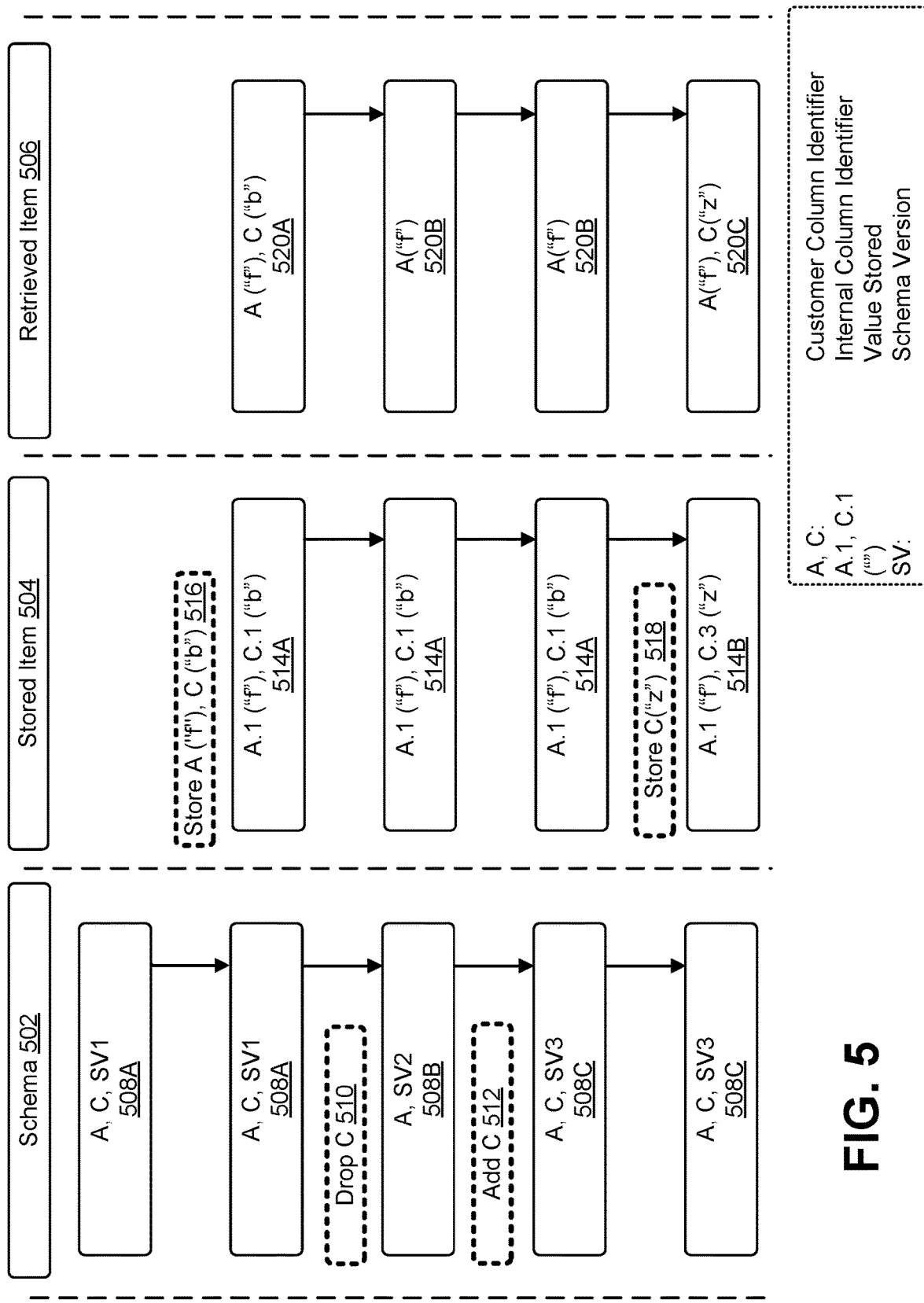
FIG. 5 illustrates an example of adding and removing columns of a table, in accordance with an embodiment.

FIG. 5 illustrates an example of adding and removing columns of a table, in accordance with an embodiment. In various embodiments, a table may be a data object which may comprise one or more other data objects, and may be structured according to a schema. Specifically, FIG. 5 depicts a schema 502, a stored item 504, and a retrieved item 506. The schema 502 may be a component of a system such as the front end 106 as described in connection with FIG. 1 that may manage and/or process schemas. The stored item 504 may refer to items stored by a system such as the data storage service 114 as described in connection with FIG. 1. The retrieved item 506 may be refer to items retrieved from the data storage service 114 through the front end 106.

In various embodiments, an entity, such as a user, client, or customer, may desire to create a data object that may be structured according to a schema. The entity may desire to generate and utilize a table 508A. The entity may submit a request to a front end system, which may maintain the schema 502 which may be a data object, data store, and/or database that may maintain various data regarding schemas of various data objects, to create the table 508A. The entity may submit a request to the front end system to generate the table 508A, which may be a table defined by a schema version 1, depicted as "SV1," and may comprise two columns, depicted as "A" and "C." In various embodiments, the entity may indicate that the two columns, "A" and "C," comprise data represented by "f" and "b," respectively.

The front end system may interact with a database to cause the database to store 516 data objects "A("f")" and "C("b")," which may correspond to elements of table 508A. The database may store item 514A, which may comprise data objects "A.1 ("f")" and "C.1("b")," which may correspond to schema version 1 of column "A" and schema version 1 of column "C." In various embodiments, if the entity desires to access the table 508A, the front end may interact with the database to retrieve item 520A, which may correspond to data of the table 508A. In various embodiments, the database may internally store data objects "A("f")" and "C("b")" as "A.1 ("f")" and "C.1 ("b")," respectively, and, upon a request to retrieve data objects "A("f")" and "C("b")," may retrieve the data objects from the internally stored "A.1 ("f")" and "C.1 ("b")."

The entity may then desire to drop 510 column "C" of the table 508A, to form table 508B with an updated schema version 2, depicted as "SV2." The front end system may interact with the database such that, upon access of table 508B, only item 520B is retrieved comprising data object "A("f")." In various embodiments, the database may still store data objects "A.1 ("f")" and "C.1 ("b")" but only allow the entity to retrieve data object "A("f")" corresponding to the schema version 2 of table 508B.

The entity may desire to add 512 a column denoted as "C" and comprising data represented by "z," to form table 508C with an updated schema version 3, depicted as "SV3." The front end system may interact with the database to cause the database to store 518 data object "C("z")," which may correspond to elements of the table 508C. The database may store item 514B, which may comprise data object "C.3 ("z")," which may correspond to schema version 3 of column "C." In various embodiments, if the entity desires to access the table 508C, the front end may interact with the database to retrieve item 520C comprising data objects "A("f")" and "C("z")," which may correspond to data of the table 508C. In various embodiments, the database may still store data object "C.1 ("b")" such that schema version 1 of column "C" comprising data represented by "b" may be restored. In various embodiments, the database may delete data object "C.1 ("b")" after a predetermined elapsed time. In some examples, modifications of a schema (e.g., addition, removal, and modifications of columns of a table defined by a schema) may be tracked through the usage of one or more counters, which may monotonically increase based on various changes of the schema to determine internal identifiers for new/modified columns for storage. For example, a column may be generated as part of a table defined by a schema and caused to be stored in a database. The column may be assigned an internal identifier, which may be determined by a counter, that may indicate its location in the database. The schema may be modified, in which the column may be modified to generate a modified column, which may be stored in the database. The modified column may be assigned a new internal identifier determined by the counter, which may correspond to the previous internal identifier incremented by a fixed value, that may indicate its location in the database. In some aspects, the internal column names or identifiers may be selected based on a predefined scheme, such as monotonically increasing. The internal identifiers used for already stored or modified items may be tracked such that data in the database is not mistakenly overwritten, and the correct internal column identifier is determined and used to store new data.

Figure 6:
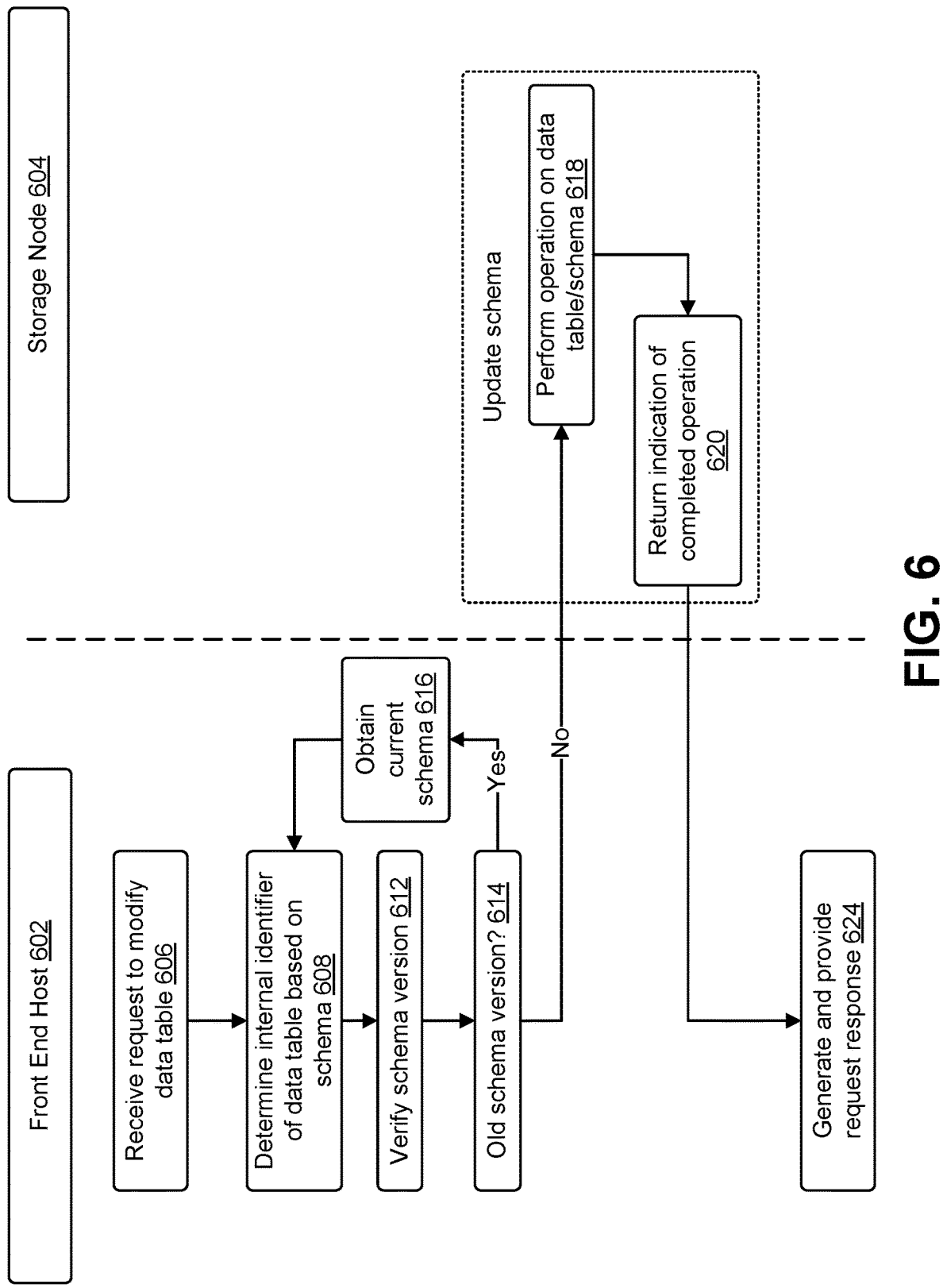
FIG. 6 illustrates an example process of modifying a schema of a data table, in accordance with an embodiment.

FIG. 6 illustrates an example process of modifying a data table, in accordance with an embodiment. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer software program persistently stored on magnetic, optical, or flash, or other persistent storage media). For example, some or all of process 600 may be performed by any suitable system, such as one or more systems depicted in FIG. 9.

A front end host 602 may receive a request to modify a data table 606. The front end host 602 may be a front end of a database system, and may be a system such as the front end 106 as described in connection with FIG. 1. The request may be generated by an entity, which may be a client or user of the front end host 602 and the database system. The data table may be stored in the database system, which may comprise storage nodes such as storage node 604, and the front end host 602 may manage data stored in the database system. The front end host 602 may process the request. The request may be formatted in various programming languages, such as structured query language, and/or variations thereof. The front end host 602 may parse the request to determine various characteristics of the request. In various embodiments, the request may indicate a schema of the data table. The request may indicate one or more operations to be performed on the data table, including adding/removing columns, modifying columns, and/or variations thereof.

The front end host 602 may determine an internal identifier of the data table based on the schema 608. The front end host 602 may comprise one or more data stores that may maintain/manage various schemas for various data objects. The front end host 602 may comprise one or more data objects, data stores, databases, and/or variations thereof that may manage schemas for data objects that may be stored in various formats in the database system. The front end host 602 may determine the internal identifier of the data table based on the schema, and determine if the schema indicated in the request matches the schema stored by the front end host 602 for the data table. The front end host 602 may verify the schema version 612 by comparing the schema indicated in the request to the schema stored by the front end host 602 for the data table. The front end host 602 may determine if the schema stored by the front end host 602 is an old schema version 614. The front end host 602 may utilize a front end version indicator that may track schema versions on behalf of the front end host 602. If the front end host determines that the schema is an old version, the front end host 602 may obtain the current schema 616 to update the schema stored by the front end host 602 to match the schema indicated in the request.

The front end host 602 may perform an operation on the data table 618, which may include an operation to change the schema. The front end host 602 may interact with the database system comprising the storage node 604 to perform the operation. In various embodiments, the storage node 604 may be a location in which one or more components of the data table is stored. The data table may be stored according to various policies of the storage node 604, and may not necessarily be stored according to the schema indicated in the request. In some examples, the front end host 602 may present data stored in the database system according to various schemas, in which entities may perform one or more operations utilizing the various schemas; however, the data stored in the database system may be stored according to various policies that may not necessarily correspond to the various schemas.

The front end host 602 may cause a storage node 604 of the database system to perform one or more operations corresponding to the modifications indicated in the request, at operation 618. The database system may return the indication of the completed operation 620 to the front end host 602. In various embodiments, the database system may return an identifier corresponding to a location of one or more data objects within the database system corresponding to the modified data table. The front end host 602 may, as a result, store the updated the schema, including one or more new data identifiers that may correspond to the modified data table/schema. The schema may be updated such that it comprises identifiers that correspond to one or more elements stored in the database system generated as a result of the modifications. The front end host 602 may then generate and provide a request response 624. The front end host 602 may return an indication that the operations indicated in the request have been completed to the entity that submitted the request.

Figure 7:
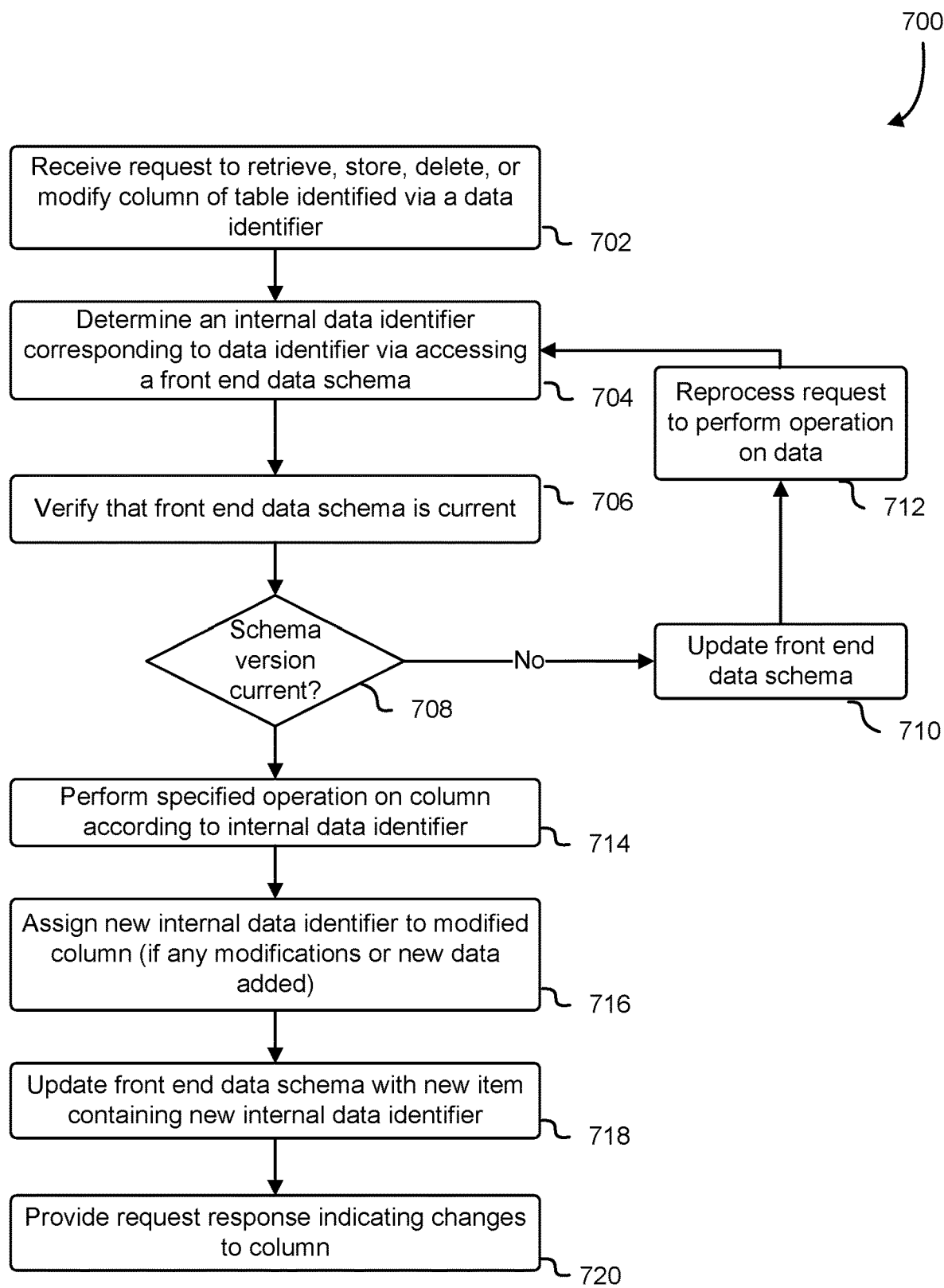
FIG. 7 illustrates another example process of modifying a schema of a data table, in accordance with an embodiment.

FIG. 7 is a flowchart that illustrates an example of a process 700 for modifying a table, in accordance with an embodiment. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer software program persistently stored on magnetic, optical, or flash, or other persistent storage media). For example, some or all of process 700 may be performed by any suitable system, such as one or more systems depicted in FIG. 9. In an embodiment, the process 700 includes a series of operations wherein a table structured according to a schema is modified.

The system performing the process 700 may receive 702 a request to retrieve, store, delete, or modify a column of a table identified via a data identifier. The system may receive the request from an entity, which may be a client, user, or customer of a database system that may be managed by a front end system. The request may indicate a schema that may define the structure of the table. The request may be formatted utilizing one or more query languages. The system may parse the request to determine the data identifier of the column of the table.

The system performing the process 700 may determine 704 an internal data identifier corresponding to the data identifier via accessing a front end data schema. The system may access the front end data schema, which may be a data store, data object, or database that may manage and maintain various schemas. The front end data schema may map elements of various schemas to data stored in the database system, and may be part of the front end system. The system may utilize the front end data schema to determine an internal data identifier of the column, which may correspond to a location of one or more elements stored in the database system that may correspond to the column.

The system performing the process 700 may verify 706 that the front end data schema is current. The system may compare the front end data schema with the schema identified in the request. The system performing the process 700 may determine 708 if the schema version indicated by the front end data schema is current. If the schema version is not current (e.g., the schema version indicated by the front end data schema does not match the schema indicated in the request received by the system), the system performing the process 700 may update 710 the front end data schema such that the schema version indicated by the front end data schema matches the schema indicated in the request, and reprocess 712 the request to perform an operation on the data.

The system performing the process 700 may perform 714 a specified operation on the column according to the internal data identifier. The system may perform one or more operations to cause the database system to perform the specified operation on one or more data objects stored in the database system, which are identified by the internal data identifier, that correspond to the column. The system performing the process 700 may assign 716 a new internal data identifier to the modified column (if any modifications or new data is added). In various embodiments, the system may generate the new internal data identifier to correspond to one or more data objects stored in the database system that correspond to the modified column after the specified operation has been performed.

The system performing the process 700 may update 718 the front end data schema with a new item containing the new internal data identifier. The system may update the front end data schema such that it comprises the new internal data identifier. The system performing the process 700 may provide 720 a request response indicating the changes to the column. The system may return an indication that the operations indicated in the request have been completed to the entity that submitted the request.

In some examples, each storage node may maintain a version of the schema. The front end may send instructions to a storage node to perform the requested operation on the data table, using the version of the schema currently maintained by the front end. The storage node, upon receiving the instruction to perform the operation, may compare the schema version indicated by the front end and the schema version maintained by the front end. If they match, the storage node may perform the operation. If the versions do not match, the storage node may send an error message to the front end and/or the current schema version, and cause the front end to update its schema version before processing the request a second time.

Figure 8:
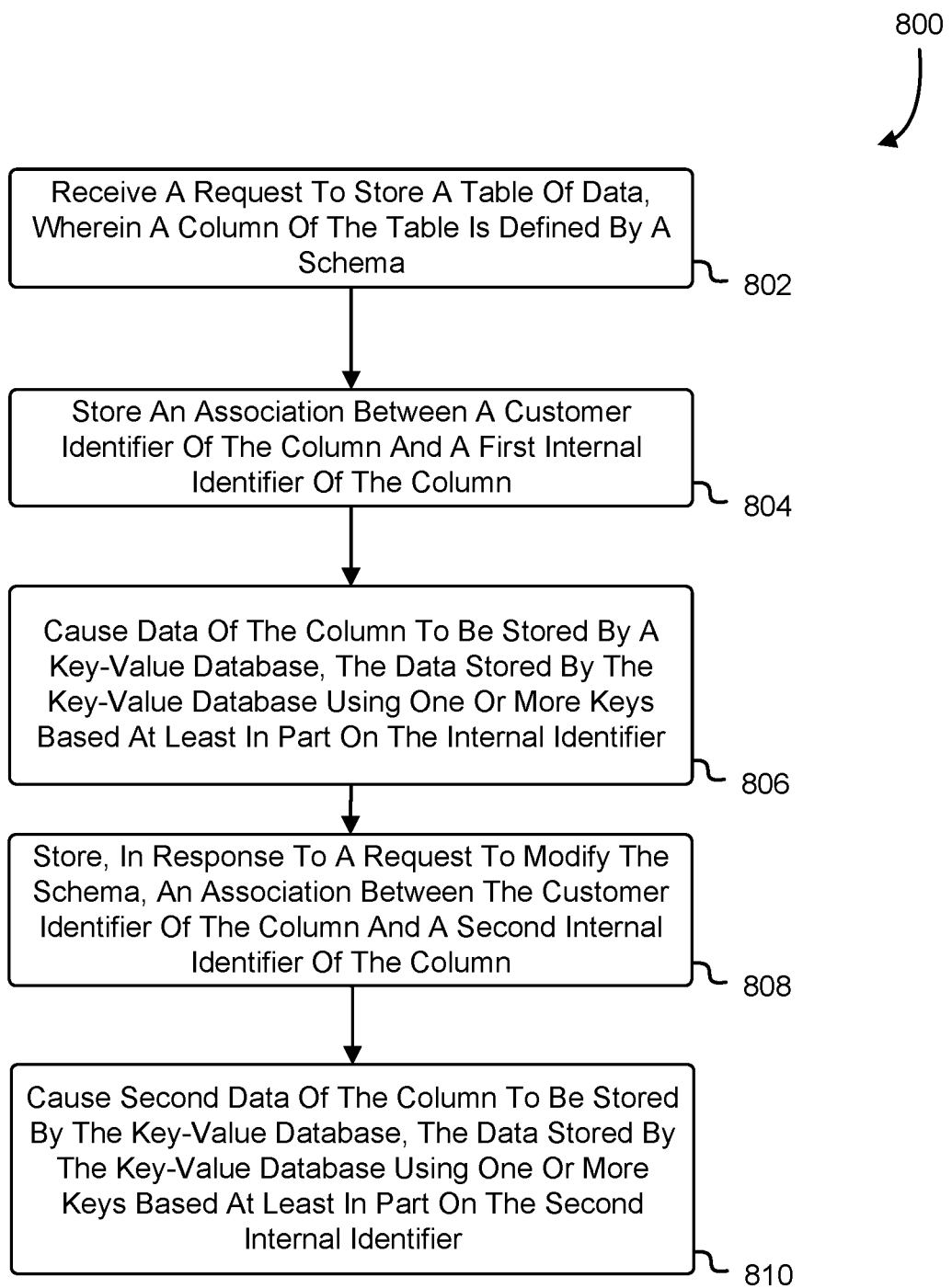
FIG. 8 illustrates an example of a process for modifying a schema, in accordance with an embodiment.

FIG. 8 is flowchart that illustrates an example of a process 800 for modifying a schema, in accordance with an embodiment. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer software program persistently stored on magnetic, optical, or flash, or other persistent storage media). For example, some or all of process 800 may be performed by any suitable system, such as one or more systems depicted in FIG. 9. In an embodiment, the process 800 includes a series of operations wherein data structured according to a schema is stored and the schema is modified.

The system performing the process 800 may receive 802 a request to store a table of data, wherein a column of the table is defined by a table-oriented or relational schema. In some examples, the system performing the process 800 may be a front-end of a database system, and may perform one or more operations in connection with the database system. The database system may be a key-value or non-relational database system, and may store data in various formats/structures. In various examples, the database system may store collections of items. In some examples, an item may represent a data object. Each item may be composed of one or more attributes. In various embodiments, an attribute is a fundamental data element. In some examples, an attribute may similar to a field or column as defined in various database systems.

The system may receive the request through one or more communication networks. In some examples, the request may be formatted utilizing one or more query languages, such as structured query language (SQL) or variations thereof. In various embodiments, the request may indicate a table of data to be stored in the key-value database system; the table may be defined by a table-oriented or relational schema that may define the structure of the table of data.

The system performing the process 800 may store 804 an association between a customer identifier of the column and a first internal identifier of the column. In various embodiments, the system may maintain one or more database systems in connection with the key-value database system. The system may maintain a database that comprises identifiers of various components of data objects to be stored by the system within the key-value database system. In some examples, the system may maintain a database that comprises identifiers that are associated with data stored within the key-value database system.

The system performing the process 800 may cause 806 data of the column to be stored by the key-value database system, in which the data is stored by the key-value database system using one or more keys based at least in part on the first internal identifier. The system may perform one or more operations in connection with the key-value database system such that data of the column is stored by the key-value database system. In various embodiments, the system may submit a request to the key-value database system to store the data. In some examples, a key may be determined based on the first internal identifier, and may be utilized in connection with the system to cause the key-value database system to store the data.

The system performing the process 800 may store 808, in response to a request to modify the table-oriented schema, an association between the customer identifier of the column and a second internal identifier of the column. The system may receive the request through one or more communication networks. In some examples, the request may be formatted utilizing one or more query languages. In various embodiments, the request may indicate a modification of the table-oriented schema of the table of data. In some examples, one or more elements corresponding to the table of data may be stored according to various policies in the key-value database system. The request may indicate one or more operations to modify the table, such as adding a column, removing a column, modifying a column, and/or variations thereof. The system may store an association between the customer identifier of the column and a second internal identifier of the column, which may correspond to the modification indicated in the request.

The system performing the process 800 may cause 810 second data of the column to be stored by the key-value database system, in which the data is stored by the key-value database system by using one or more keys based at least in part on the second internal identifier. The system may perform one or more operations in connection with the key-value database system such that the second data of the column is stored by the key-value database system. The second data of the column may correspond to a column of the table to be modified, which may be indicated in the request. In various embodiments, the system may submit a request to the key-value database system to store the data. In some examples, a key may be determined based on the second internal identifier, and may be utilized in connection with the system to cause the key-value database system to store the data.

Figure 9:
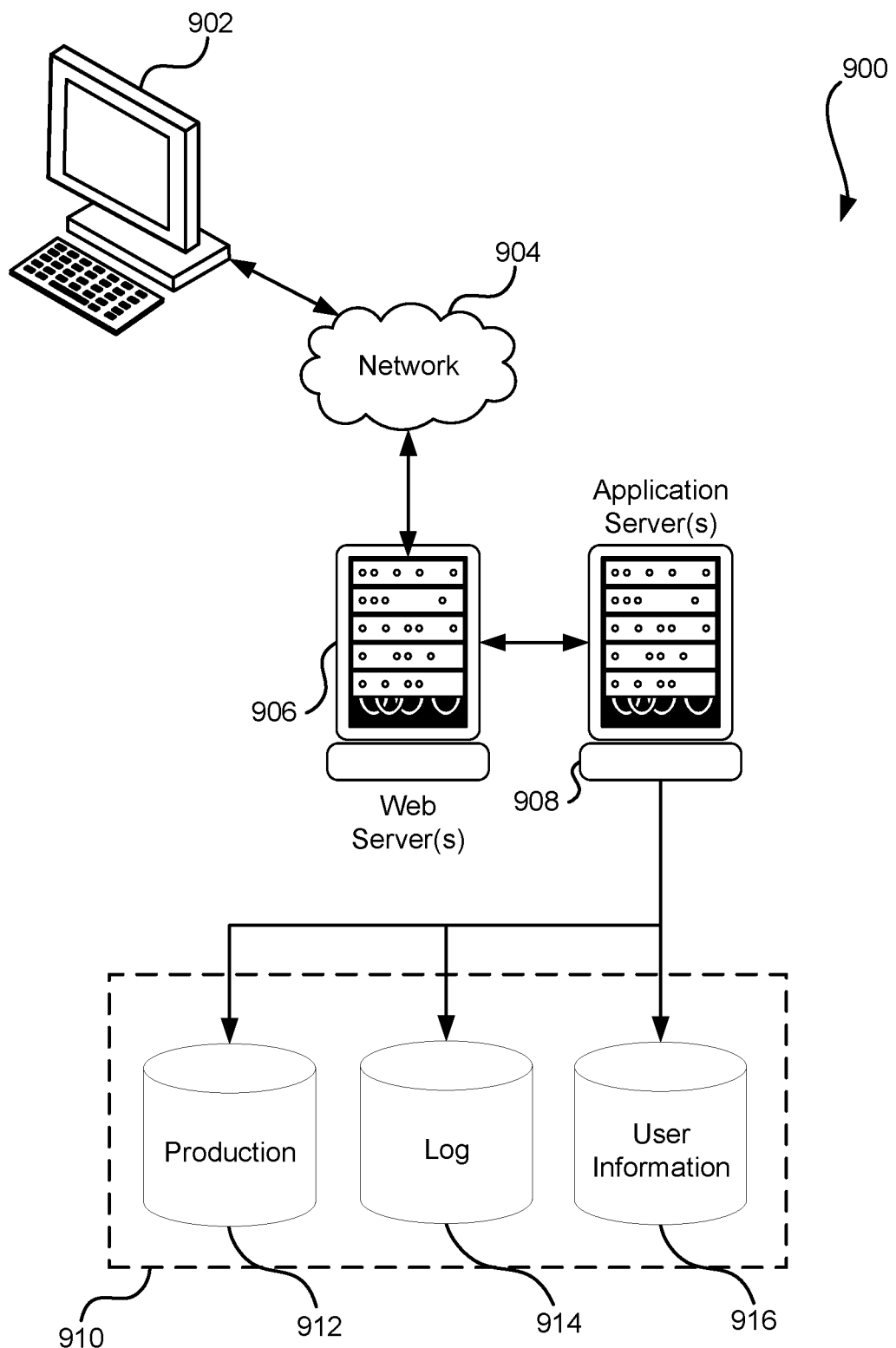
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, key-value servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system comprising
    a data storage service accessible via a front end host, wherein the data storage service comprises a plurality of nodes of a table-oriented database;
    a front end host comprising a customer interface and a table-oriented schema, wherein the front end host includes instructions that as a result of being executed by the system, cause the system to:
        receive a request to store a table of data through the customer interface, wherein the table is defined by the table-oriented schema and includes a column;
        store a first association between a customer identifier of the column and a first internal identifier of the column;
        cause data of the column to be stored by the data storage service, the data stored by the data storage service using one or more keys based at least in part on the internal identifier;
        store, in response to a request to modify the table-oriented schema, a second association between the customer identifier of the column and a second internal identifier of the column; and
        cause second data of the column to be stored by the data storage service, the second data stored by the data storage service using one or more second keys based at least in part on the second internal identifier.

2. The system of claim 1, wherein the instructions, that as a result of being executed by the system, further cause the system to:
    maintain, by individual nodes of the plurality of nodes, a schema version, wherein the schema version is updated in response to storing the second data of the column by an individual node of the data storage service; and
    upon verifying that a version of the table-oriented schema of the front end host corresponds to the schema version of the individual node, storing the second data of the column by the individual node.

3. The system of claim 2, wherein the instructions, that as a result of being executed by the system, further cause the system to:
    upon determining that a version of the table-oriented schema of the front end host does not correspond to the schema version of an individual node:
    update the version of the table-oriented schema of the front end host; and
    cause the second data of the column to be stored by the individual node.

4. The system of claim 1, wherein the second internal identifier comprises a value monotonically increased from the first internal identifier.

5. A computer-implemented method, comprising:
    receiving a request to store a table of data, wherein a column of the table is defined by a schema;
    storing a first association between a customer identifier of the column and a first internal identifier of the column;
    causing data of the column to be stored by a key-value database, the data stored by the key-value database using one or more keys based at least in part on the internal identifier;
    storing, in response to a request to modify the schema, a second association between the customer identifier of the column and a second internal identifier of the column; and
    causing second data of the column to be stored by the key-value database, the second data stored by the key-value database using one or more keys based at least in part on the second internal identifier.

6. The computer-implemented method of claim 5, further comprising updating a front end version indicator of the schema in response to storing the association between the customer identifier of the column and the second internal identifier of the column.

7. The computer-implemented method of claim 6, further comprising:
    causing the data of the column to be stored by a storage node of the key-value database;
    verifying that a tracked version indicator maintained by the storage node corresponds to the front end version indicator; and
    upon verifying that the tracked version indicator corresponds to the front end version indicator, causing the second data of the column to be stored by the storage node of the key-value database.

8. The computer-implemented method of claim 7, further comprising:
    tracking a version indicator of the schema by the storage node, wherein the version indicator increases in response to changes to at least one column of the table being stored by the storage node.

9. The computer-implemented method of claim 8, further comprising:
    tracking the version indicator of the schema by the storage node on a partition level.

10. The computer-implemented method of claim 5, wherein the second internal identifier comprises a value monotonically increased from the first internal identifier.

11. The computer-implemented method of claim 5, further comprising:
storing each of the first association and the second association as entries in a data map of the schema.

12. The computer-implemented method of claim 11, further comprising:
receiving a request to access a prior version of the schema;
accessing an entry in the schema corresponding to the prior version based on an association of a plurality of associations.

13. The computer-implemented method of claim 5, wherein the request to modify the schema comprises a request to modify at least one of a column name, a column attribute, or a column data type.

14. The computer-implemented method of claim 13, further comprising:
responsive to the request to modify the schema, modifying the schema without modifying the table of data.

15. A non-transitory computer-readable storage medium storing thereon executable instructions that, as a result of being executed by one or more processors of a computer system, cause the computer system to at least:
receive a request to modify a schema of a table of data stored by a key-value database, wherein at least a column of the table is defined by the schema;
store, in response to the request to modify the schema, an association between a customer identifier of the column and an internal identifier of the column, wherein the association updates a prior association between the customer identifier of the column and a prior internal identifier of the column;
cause data of the column to be stored by the key-value database, the data stored by the key-value database using one or more keys based at least in part on the internal identifier.

16. The non-transitory computer-readable storage medium of claim 15,
wherein the internal identifier comprises a value monotonically increased from the prior internal identifier.

17. The non-transitory computer-readable storage medium of claim 15, wherein the instructions that, as a result of being executed by the one or more processors, further cause the computer system to:
receive a request to access data according to a prior version of the schema corresponding to the prior association;
use the prior association to access data stored in the table-oriented database according to the prior internal identifier.

18. The non-transitory computer-readable storage medium of claim 15, wherein the instructions that, as a result of being executed by the one or more processors, further cause the computer system to:
updating a version of the schema in response to storing the association between the customer identifier of the column and the internal identifier of the column.

19. The non-transitory computer-readable storage medium of claim 18 wherein the schema is maintained by a front end host, and wherein the instructions, that as a result of being executed by the one or more processors of the computer system, further cause the computer system to at least:
cause the data of the column to be stored by a storage node of the key-value database;
verify that a version of the schema maintained by the storage node corresponds to a version of the schema maintained by the front end host; and
upon verifying that the version maintained by the storage node corresponds to the version maintained by the front end host, causing the data of the column to be stored by the storage node of the key-value database.

20. The non-transitory computer-readable storage medium of claim 19, wherein the instructions, that as a result of being executed by the one or more processors of the computer system, further cause the computer system to at least:
track the version of the schema maintained by the storage node, wherein the version increases in response to changes to at least one column of the table being stored by the storage node.

* * * * *